(12) United States Patent
Lee (10) Patent No.: US 8,401,778 B2
(45) Date of Patent: Mar. 19, 2013

(54) SYSTEM FOR DISPLAYING A CUMULATIVE FUEL ECONOMIC DRIVING AREA AND METHOD THEREOF

(75) Inventor: Young Jin Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 894 days.

(21) Appl. No.: 12/509,567

(22) Filed: Jul. 27, 2009

(65) Prior Publication Data

US 2010/0082228 A1 Apr. 1, 2010

(30) Foreign Application Priority Data

Sep. 29, 2008 (KR) .................. 10-2008-0095361

(51) Int. Cl.
*G06F 17/00* (2006.01)
*G06F 19/00* (2006.01)

(52) U.S. Cl. ..................... 701/123; 701/36; 340/439

(58) Field of Classification Search .............. 701/51, 701/67, 53, 70, 123, 1, 36; 340/425.5, 439, 340/441, 438
See application file for complete search history.

(56) References Cited

U.S. PATENT DOCUMENTS

| 4,002,062 | A | * | 1/1977 | Kuno et al. | ........ 73/114.53 |
| 6,985,804 | B2 | * | 1/2006 | Minami | ........... 701/64 |
| 7,072,762 | B2 | * | 7/2006 | Minami et al. | ........ 701/123 |
| 2005/0209771 | A1 | * | 9/2005 | Ishiguro | ........ 701/123 |

FOREIGN PATENT DOCUMENTS

| JP | 2000-088625 A | 3/2000 |
| JP | 2002-274219 A | 9/2002 |
| JP | 2002362185 A | 12/2002 |
| JP | 2007-297026 B1 | 5/2007 |
| JP | 2008-055963 A | 3/2008 |
| KR | 10-2000-0025188 A | 5/2000 |
| KR | 10-2003-0008383 A | 1/2003 |

* cited by examiner

*Primary Examiner* — Christine Behncke
(74) *Attorney, Agent, or Firm* — Edwards Wildman Palmer LLP; Peter R. Corless (57) ABSTRACT

The present invention relates to a system and a method for displaying an accumulative fuel economic driving area of a vehicle. A system according to an embodiment includes a vehicle information unit that collects vehicle information and a controller that calculates a fuel economic driving area by using the vehicle information, and calculates an accumulative fuel economic driving area by accumulating respective lighting times of respective zones of the fuel economic driving area and calculating respective accumulation ratios of the respective zones. The system provides the driver with information for fuel economic driving.

12 Claims, 7 Drawing Sheets

SYSTEM FOR DISPLAYING A CUMULATIVE FUEL ECONOMIC DRIVING AREA AND METHOD THEREOF

CROSS-REFERENCE TO RELATED APPLICATION

This application claims under 35 U.S.C. §119(a) the benefit of Korean Patent Application No. 10-2008-0095361 filed Sep. 29, 2008, the entire contents of which are incorporated herein by reference.

BACKGROUND

The present disclosure relates to a system for displaying an accumulative fuel economic driving area and a method thereof.

Recently, the need and interest in increasing the fuel efficiency of vehicles have been considerably increased due to the concern of the rise of oil prices and other environmentally related problems.

The fuel efficiency of a vehicle is affected by the driving habit of a driver, such as rapid acceleration or quick braking. Conventional systems and methods, as disclosed in Korea Publication Nos. KR2000-0025188, and KR2003-0008383, however, provide information on the present momentary fuel efficiency of a vehicle by considering only the characteristics of the engine of the vehicle. Shifting information according to the driving habit of the driver is not considered at all.

That is, the conventional systems and methods consider only the tuning of an engine and a transmission to increase the fuel efficiency without taking into account driver's driving habit relating to the operation of accelerating and braking. As a result, the effect of diminishing fuel consumption is insufficient.

The above information disclosed in this the Background section is only for enhancement of understanding of the background of the invention and therefore, it may contain information that does not form the prior art that is already known in this country to a person of ordinary skill in the art.

SUMMARY OF THE INVENTION

The present invention provides a system and a method for displaying an accumulative fuel economic driving area by accumulating data for displaying a fuel economic driving area while displaying the driving state of a driver in a fuel economic driving area.

In one aspect, the present invention provides a system for displaying the accumulative fuel economic driving area, which includes a vehicle information unit that collects vehicle information and a controller that calculates a fuel economic driving area by using the vehicle information, and calculates an accumulative fuel economic driving area by accumulating respective lighting times of respective zones of the fuel economic driving area and calculating respective accumulation ratios of the respective zones.

In another aspect, the present invention provides a method for displaying an accumulative fuel economic driving area of a vehicle, which comprises: calculating, by a controller, a fuel economic driving area by using vehicle information and a shift pattern map, and calculating respective accumulated lighting times of respective zones of the fuel economic driving area; calculating, by the controller, respective ratios of the respective accumulated lighting times of the respective zones; and displaying, by a display unit, the respective ratios.

The above and other aspects and features of the present invention will be apparent from or are set forth in more detail in the accompanying drawings, which are incorporated in and from a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated by the accompanying drawings which are given hereinafter by way of illustration only, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use in the environment.

DETAILED DESCRIPTION OF EMBODIMENTS

Hereinafter, embodiments of the systems and methods of displaying an accumulative fuel economic driving area according to the present invention will be described in detail with reference to the attached FIGS. 1 to 6.

Figure 1:
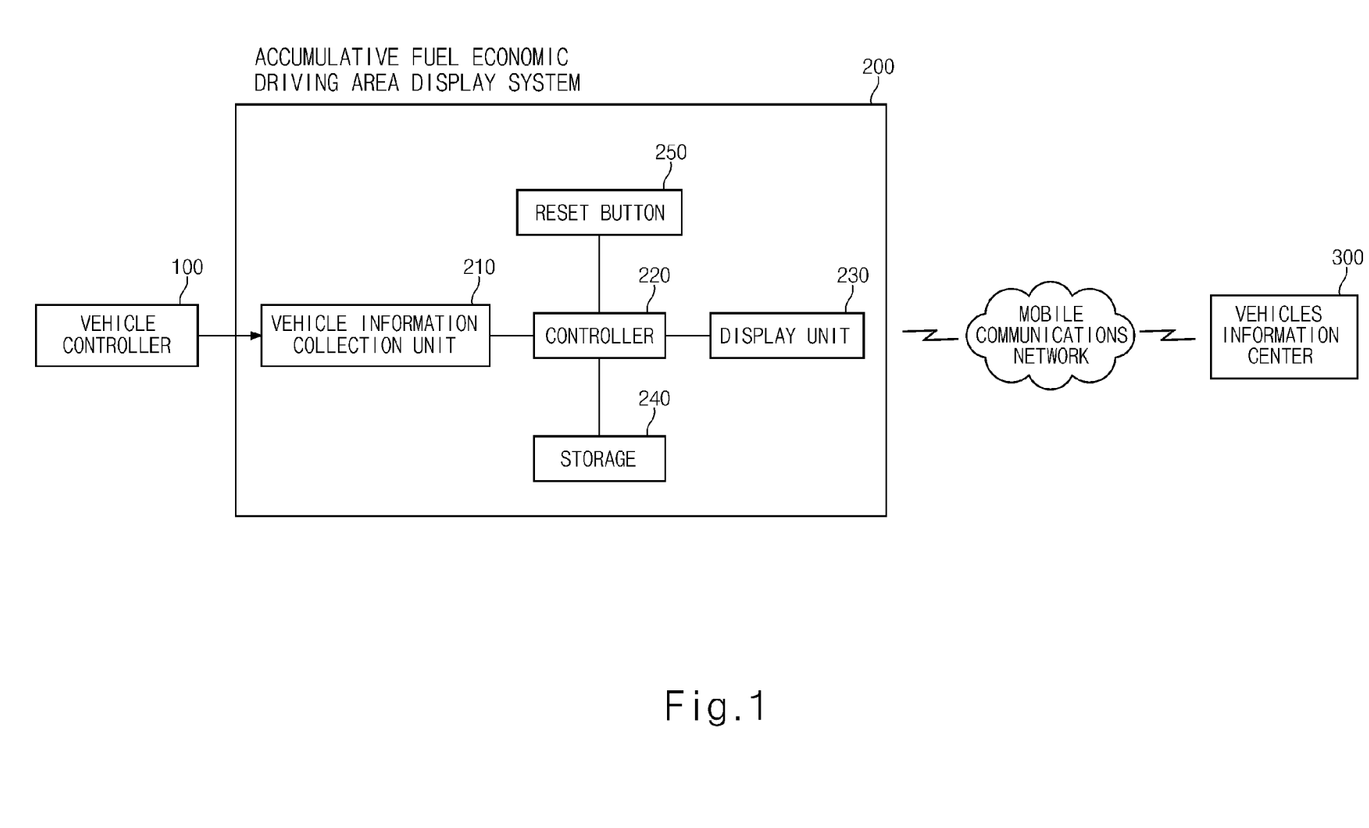
FIG. 1 is a configuration diagram of an accumulative fuel economic driving area display system according to an embodiment of the present invention.

FIG. 1 is a configuration diagram of an accumulative fuel economic driving area display system according to an embodiment of the present invention.

The accumulative fuel economic driving area display system according to an embodiment of the present invention includes a vehicle information collection unit 210, a controller 220, a display unit 230, and a storage unit 240.

The vehicle information collection unit 210 collects from a vehicle controller such as an engine controller (not shown) or a shift controller (not shown) various vehicle information including, e.g., vehicle speed information, engine torque information, a TPS (throttle position sensor) value, shift pattern data, and current state of on/off of shift-gear and damper clutch data. For example, the vehicle speed and the TPS value may be collected from the engine controller and the current state of on/off of shift-gear and damper clutch and the shift pattern data may be collected from the shift controller. However, it is not limited thereto, and the above-listed information may be obtained from, e.g., a vehicle speed sensor and a TPS.

The controller 220 calculates a current traveling state and a fuel economic driving area by using the vehicle information and a shift pattern map, and accumulates the fuel economic driving area for a predetermined time, and then, calculates the ratio of the accumulated fuel economic driving area. The controller 220 may control the accumulative fuel economic driving area data to be reset or displayed when an input is generated from a reset button 250. The fuel economic driving area may be displayed in various ways in consideration of design choice. For instance, it may be divided to a maximum fuel economic driving area, an intermediate fuel economic driving area and a minimum fuel economic driving area and may be displayed in different colors, e.g., green, white and red, respectively.

Figure 3:
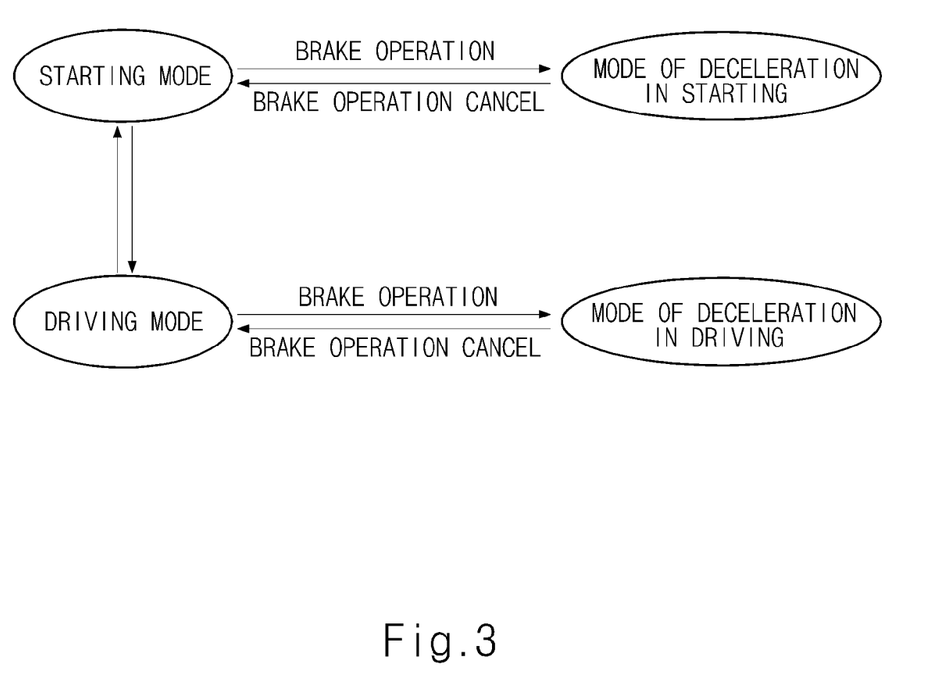
FIG. 3 is a schematic diagram illustrating the conditions for determining an operation mode according to an embodiment of the present invention.

Firstly the controller 220 determines an operation mode in order to calculate the fuel economic driving area. As shown in FIG. 3, the operation mode may be classified into a starting mode, a mode for deceleration in starting operation, a driving mode, and a mode for deceleration in driving operation. The starting mode refers to a state in which the speed of a vehicle is lower than a predetermined vehicle speed after starting. The mode for deceleration in starting operation refers to a state in which the brake is operated in the starting mode. The driving mode refers to a state in which the speed of vehicle is higher than a predetermined vehicle speed. The mode for deceleration refers to a state in which the brake is operated in the driving mode. If the brake operation is canceled during the deceleration mode in starting operation, it returns to the starting mode, while if the brake operation is canceled during the mode of deceleration in driving operation, it returns to the driving mode. Thus, the controller 220 may calculate the fuel economic driving area with respect to each of the starting mode, the driving mode, the deceleration modes (i.e., the modes of deceleration in starting operation and driving operation).

More particularly, in the starting mode, the controller 220 may determine the green zone, the white zone, and the red zone according to the conditions shown in Table 1 to calculate the respective fuel economic driving areas.

TABLE 1

|  | TPS (0~15 km/h) | TPS (16~70 km/h) |
| --- | --- | --- |
| Green Zone | 1~A % | 0~A' % |
| White Zone | 0%, A~B % | A'~B' % |
| Red Zone | B~100% | B'~100% |

As shown in Table 1, when the vehicle speed is 0~15 km/h in the starting mode, the controller 220 determines the state where the TPS is 1~A %, the state where the TPS is 0% and A~B %, and the state the TPS is B~100% as a green zone, a white zone, and a red zone, respectively.

Likewise, when the vehicle speed is 16~70 km/h in the starting mode, the controller 220 determines the state where the TPS is 0~A' %, the state where the TPS is A'~B' %, and the state where the TPS is B'~100% as a green zone, a white zone, and a red zone, respectively.

In the meantime, the controller 220 determines the deceleration modes (i.e., the mode of deceleration in starting operation and the mode of deceleration in driving operation) as a green zone.

In the driving mode, the controller 220 calculates the fuel economic driving area according to on/off state of damper clutch and a shift pattern map.

Figure 4:
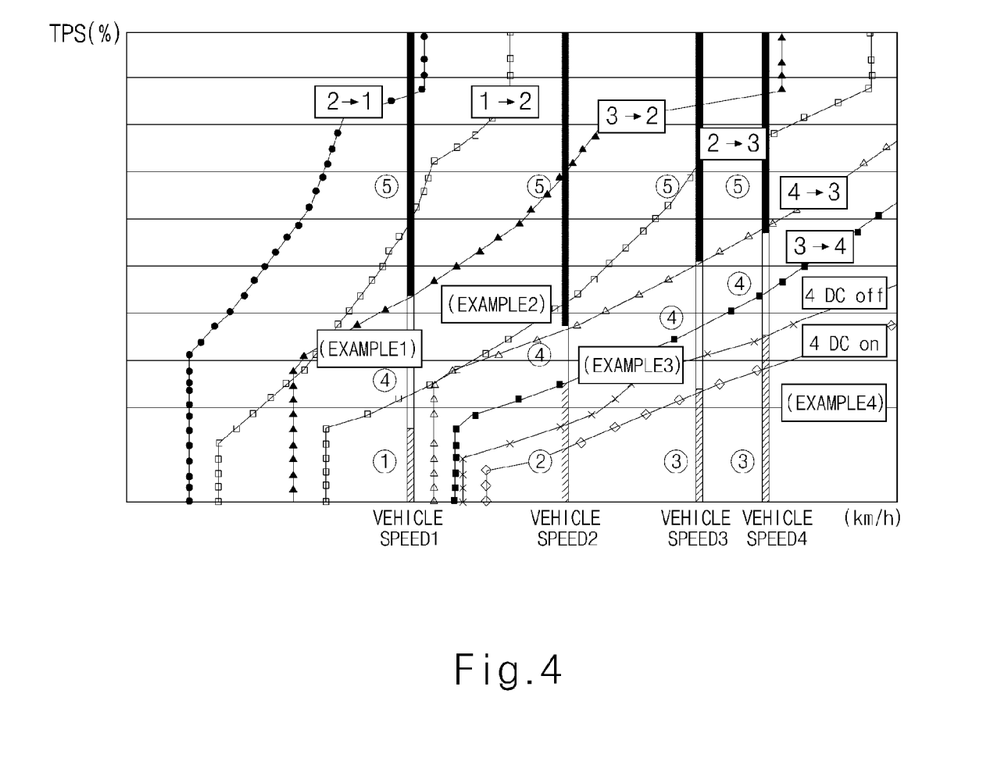
FIG. 4 is a shift pattern map illustrating a method of determining a fuel economic driving area in a driving mode among operation modes according to an embodiment of the present invention.

A method of calculating the fuel economic driving area by using a shift pattern map in a driving mode will be illustrated in detail with reference to FIG. 4. As shown in FIG. 4, data in the time point of the shift and damper clutch on/off according to the driving data of a vehicle can be indicated with a plurality of shift curves and damper clutch on/OFF curves in the shift pattern map.

Although the shift pattern of a four speed transmission is illustrated in FIG. 4, the shift pattern map for a higher speed transmission can be realized in a similar manner. In FIG. 4, 1→2 shift curve, 2→3 shift curve, and 3→4 shift curve are up-shift curves in which a shift to a higher gear is occurred, while 2→1 shift curve, 3→2 shift curve, 4→3 shift curve are down-shift curves in which a shift to a lower gear is occurred. Also, the shift pattern map of FIG. 4 is set such that damper clutch is turned on at the fourth gear.

In FIG. 4, assuming that the current driving state of a vehicle is in a vehicle speed 1 with the third gear, the area designated as ① is a fast up-shift area in which a shift to a higher gear is rapidly performed in the acceleration. That is, in the vehicle speed 1, the fast up-shift area designated as ① has the TPS value and vehicle speed lower than those corresponding to a first inflection point of 3→4 up-shift curve, so that the driving state of the vehicle passes 3→4 shift curve in the acceleration and the shift to the fourth gear is rapidly performed. In addition, in the state of the vehicle speed 1, the area designated as ④ is the white zone in which up-shift is delayed but down-shift does not occur, while the area designated as ⑤ is the red zone in which the TPS value is remarkably higher than the TPS corresponding to the current vehicle speed so that down-shift is generated.

Therefore, when it is determined that the current driving state of the vehicle is in the area designated as ④ (designated as Example 1 in FIG. 4) in the vehicle speed 1 and that the fast up-shift area designated as ① is the maximum fuel economic driving area (green zone), the controller 220 induces a driver to perform an up-shift by lowering the TPS value first and then accelerating the vehicle. In the meantime, when it is determined that the driving state is the minimum fuel economic driving area (red zone) designated as ⑤ in which the fuel efficiency is worst, the controller 220 induces a driver to lower the TPS value to a value less than the TPS value of the area designated as ①

Assuming that the current driving state of a vehicle is in a vehicle speed 2 with the third gear, the area designated as ② which is under 3→4 up-shift curve is an up-shift area in which a shift to a higher gear is performed due to the reduction of the TPS value in the current vehicle speed 2. When it is determined that the area designated as ② is a maximum fuel economic driving area (green zone) and that the current driving state of the vehicle is in the area designated as ④ or designated as ⑤ (designated as Example 2 in FIG. 4) in the vehicle speed 2, the controller 220 induces a driver to perform an up-shift by lowering the TPS value to a value less than the TPS value of the area designated as ②.

Assuming that the current driving state of a vehicle is in a vehicle speed 3 with the fourth gear, the area designated as ③ is an area in which the damper clutch is converted from off-state into on-state in the increase of vehicle speed or in the reduction of the TPS value. When it is determined that the area designated as ③ which is under the damper clutch on curve is the green zone and that the current driving state of the vehicle is in the area designated as ④ or designated as ⑤ (designated as Example 3 in FIG. 4) in the vehicle speed 3, the controller 220 induces a driver to lower the TPS value to a value less than the TPS value of the area designated as ③ so that the damper clutch can be converted to the turn-on state.

Assuming that the current driving state of a vehicle is in a vehicle speed 4 with the fourth gear, the area designated as ③ is an area in which the damper clutch on state is maintained during the speed increase of the vehicle. When it is determined that the area designated as ③ which is under the damper clutch on curve is the green zone and that the current driving state of the vehicle is in the area designated as ④ or designated as ⑤ (designated as Example 3 in FIG. 4) in the vehicle speed 4, the controller 220 induces a driver to lower the TPS value to a value less than the TPS value of the area designated as ③ so as to perform a fuel economic drive.

In FIG. 4, in the state of the vehicle speed 4, the section between the damper clutch off curve and the damper clutch on curve is an area in which the on state is maintained if the damper clutch of an actual vehicle is in on-state. Accordingly, when the driving state of the actual vehicle is within the area on the shift pattern map, the controller 220 confirms the on/off state of the damper clutch of the actual vehicle collected by the vehicle information collecting unit 210. Then, if the damper clutch is connected directly to be in on-state, the controller 220 induces such driving state to be maintained, whereas if the damper clutch is in off-state, the controller 220 induces a driver to lower the TPS value to a value less than the TPS value of the area designated as ③ so that the damper clutch may be connected directly.

That is, when the damper clutch is in on-state, the controller 220 determines the area which is under a damper clutch on curve as a green zone. Moreover, when the damper clutch is in off-state, the controller 220 determines the area which is under damper clutch off curve as a green zone.

When the damper clutch is in off-state, the controller 220 determines as a green zone an area in which an up-shift is rapidly performed, that is, an area under an inflection point of an up-shift curve, in case the gear is not the highest one with respect to a certain vehicle speed. On the other hand, in case the gear is the highest one, the controller 220 determines a green zone in the same manner as in the starting mode.

In the meantime, the controller 220 determines as a white zone an area which is under the shift pattern curve in which a down shift occurs from a currently available highest gear. The controller 220 determines as a red zone an area which exceeds the shift pattern curve in which a down shift occurs from a currently available highest gear.

As described above, the controller 220 calculates a reference TPS value and determines, based on the reference value, respective zones (e.g., green, white, and red zones). Then, according to a current TPS value, the controller 220 determines which zone the current driving state belongs to.

The controller 220 may provide information about accumulative fuel economic driving area for respective zones. As a non-limiting example, the controller 220 may control the display unit 230 to indicate the fuel economic driving area with the determined zones and calculate the ratio of each zone by accumulating lighting time. More specifically, the controller 220 may calculate the ratio of each zone by accumulating the lighting time of the green zone, the lighting time of the white zone, and the lighting time of the red zone, and indicate, based on the calculated ratio, the accumulative fuel economic driving area. Suitably, the controller 220 may transmit the accumulative fuel economic driving area information to a vehicle information center 300 through a mobile radio communications network.

In another embodiment of the invention, after calculating rate of each zone in whole the accumulative fuel economic driving zone and multiplying the calculated result by weight of each zone, the controller 220 determines that an accumulative fuel economic driving efficiency is high, if the multiplied result is higher than a fixed level.

Otherwise, if the multiplying result is lower than a fixed level, the controller 220 determines that the accumulative fuel economic driving efficiency is low.

For example, assuming that a weight of green zone is 1, a weight of white zone is 0.7, a weight of red zone is 0.4, an accumulative score can be determined by following equation.

$$(\text{green zone}(\%)*1)+(\text{white zone}(\%)*0.7)+ (\text{red zone}(\%)*0.4)=\text{accumulative score} \quad \text{[equation 1]}$$

Herein, if the accumulative score is in a range of 80 to 100, the accumulative fuel economic driving efficiency is a top class, if the accumulative score is in a range of 60 to 80, the accumulative fuel economic driving efficiency is a middle class, if the accumulative score is in a range of 40 to 60, the accumulative fuel economic driving efficiency is a bottom class.

Figure 5A:
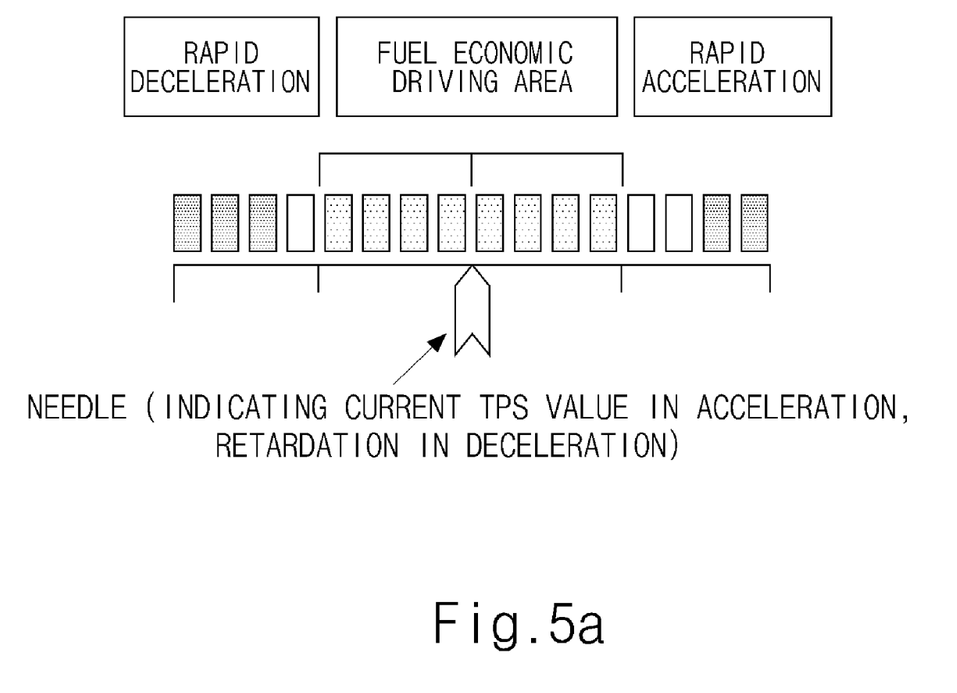
FIGS. 5a and 5b are schematic diagrams showing an example displaying the fuel economic driving area according to an embodiment of the present invention.
Figure 5B:
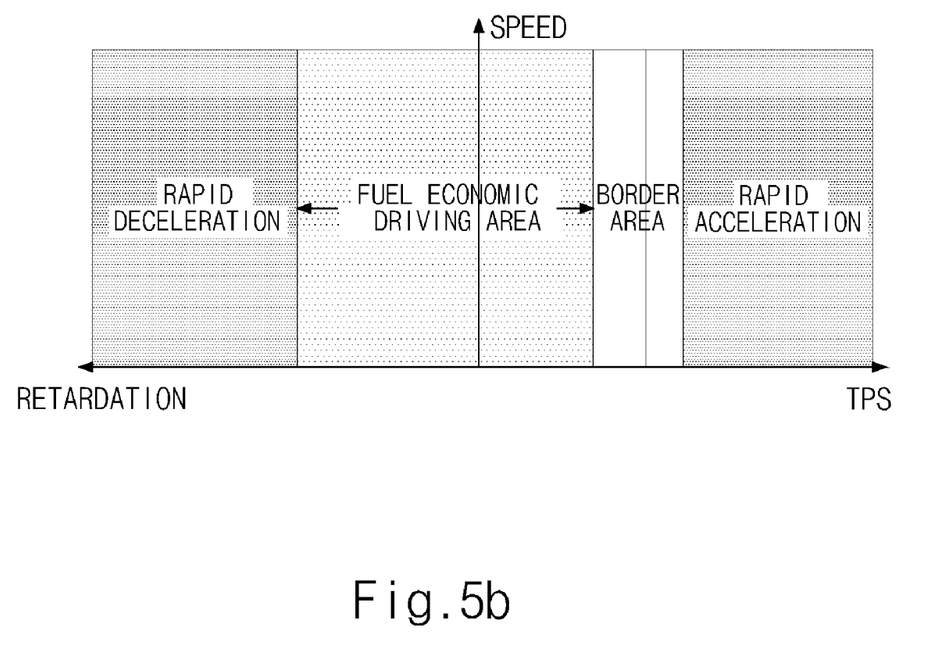
Figure 6:
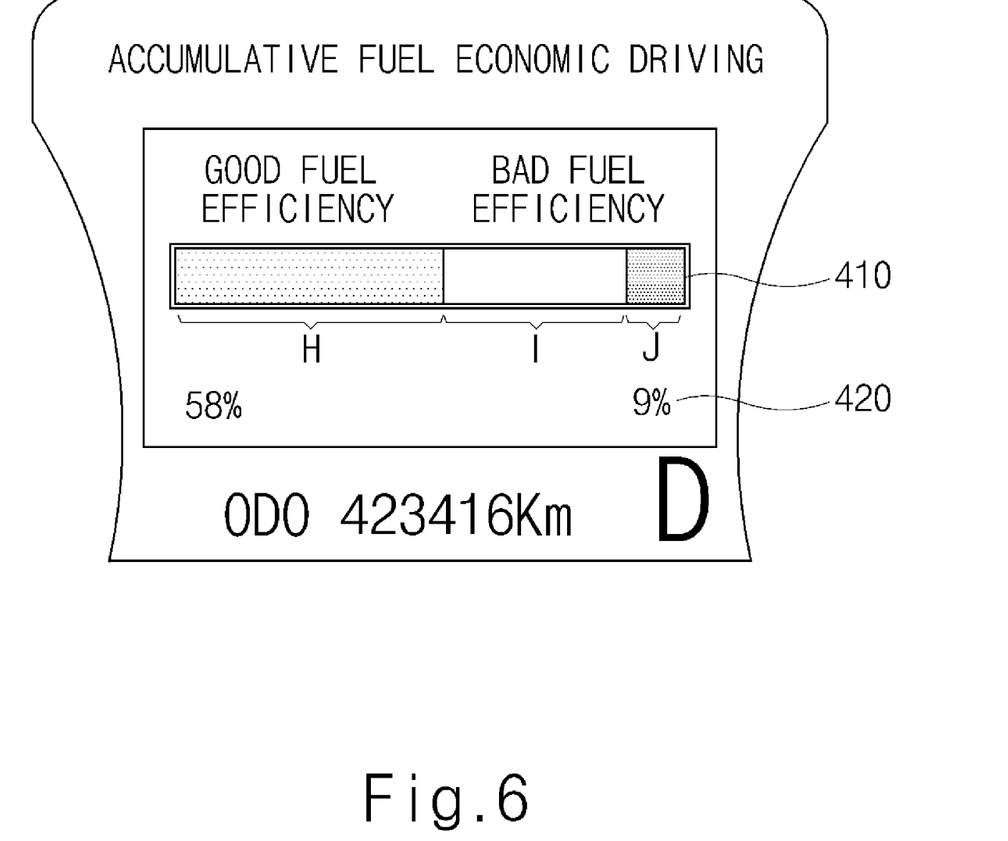
FIG. 6 is a schematic diagram showing an accumulative fuel economic driving area display screen according to an embodiment of the present invention.

FIGS. 5a and 5b are examples of fuel economic driving area displayed by the display unit 230 and FIG. 6 is an example of accumulative fuel economic driving area displayed by the display unit 230.

Referring to FIG. 5a, as indicated with one-dimension bar graph, the maximum fuel economic driving area (green zone) is indicated as an economic driving section, the fuel non-economic driving area in which a down-shift is performed in a high TPS value is indicated as a rapid acceleration section, and the driving state of vehicle is indicated with a needle (a current TPS value is indicated in the acceleration, while a retardation is indicated in the deceleration). Accordingly, when a driver looks at the bar graph to find that the vehicle is or becomes driven in the rapid acceleration section, the driver may lower the opening degree of the throttle value to decelerate the vehicle.

For instance, among the areas designated as ①, ②, ③, ④ and ⑤ of FIG. 4, the areas designated as ①, ②, ③ may be the maximum fuel economic driving area (green zone), the area designated as ⑤ may be the rapid acceleration area (red zone) in which the fuel efficiency is the worst, and the area indicated as ④ may be a border area (white zone) between the maximum fuel economic driving area (green zone) and the rapid acceleration area (red zone). The rapid deceleration section indicates the degree of the rapid deceleration state based on a predefined deceleration value according to a speed.

The two-dimension graph shown in FIG. 5b shows that the driving state of vehicle is in the maximum fuel economic driving area (green zone), the rapid acceleration (red zone), the rapid deceleration area (red zone), or the border area (white zone) with respect to the speed, the TPS, and the retardation.

As shown in FIG. 6, the display unit 230 may indicate the accumulative fuel economic driving area in the form of a bar 410 including the green zone (H), the white zone (I) and the red zone (J) through the controller 220, indicating a ratio 420 of each zone (i.e., 58%, 9%). Although, the bar is shown as an one-dimensional bar in FIG. 6, multi-dimensional bar can also be used. With this graph, a driver may control the acceleration pedal of the vehicle and the depth of the brake so that the vehicle can be driven in the maximum fuel economic driving area, thereby minimizing the fuel consumption.

In FIG. 1, it is illustrated that the display unit 230 is included in the accumulative fuel economic driving area display system 200. However, depending on the design conditions and/or requirements, the display unit 230 can be realized as a separate unit or by using the display unit of other multimedia terminal (telematics device, AVN, head unit or the like). Moreover, it can be designed such that the accumulative fuel economic driving area is indicated in the display unit 230 while the fuel economic driving area and the driving state (FIG. 4) is indicated through a cluster or an additional indicator light.

The storage unit 240 stores the vehicle information that the vehicle information collection unit 210 collects from the vehicle controller 100, the shift pattern map using shift pattern data collected from the shift controller (not shown) among the vehicle controller 100, and the fuel economic driving area accumulative information. As shown in FIG. 5, the shift pattern map may be comprised of shift pattern data in which a vehicle speed is indicated on the horizontal axis and a TPS value on the vertical axis.

By using the vehicle information collected from the vehicle information collection unit 210 and the shift pattern data stored in the storage unit 240, the accumulative fuel economic driving area display system having a configuration described above calculates the current driving state and the fuel economic driving area. If the current vehicle speed and the throttle open degree are in the green zone, it means that the vehicle is driven with highest fuel efficiency. If they are in the red zone, it signalizes that the vehicle is driven with low fuel efficiency. With this, accordingly, the driver may change the driving state to economical driving.

Based on the-thus calculated fuel economic driving area information, the time of driving in the green zone, the time of driving in the white zone, and the time of driving in the red zone are accumulated respectively. With accumulation ratio calculated, the driving time by each zone may be indicated in the display unit 230 as shown in FIG. 5.

Accordingly, the driver can check its driving time by each zone to know its own driving habits and characteristics. In an embodiment, the accumulative fuel economic driving area display system 200 may transmit such accumulative fuel economic driving area information to the vehicle information center 300. The system 200 may manage the accumulative fuel economic driving area information stored in the vehicle information center 300 to provide a driver with more useful information. For example, the accumulative fuel economic driving area may be analyzed monthly, seasonally, and/or hourly with which the driver can more accurately know its own driving habits and characteristics.

Figure 2:
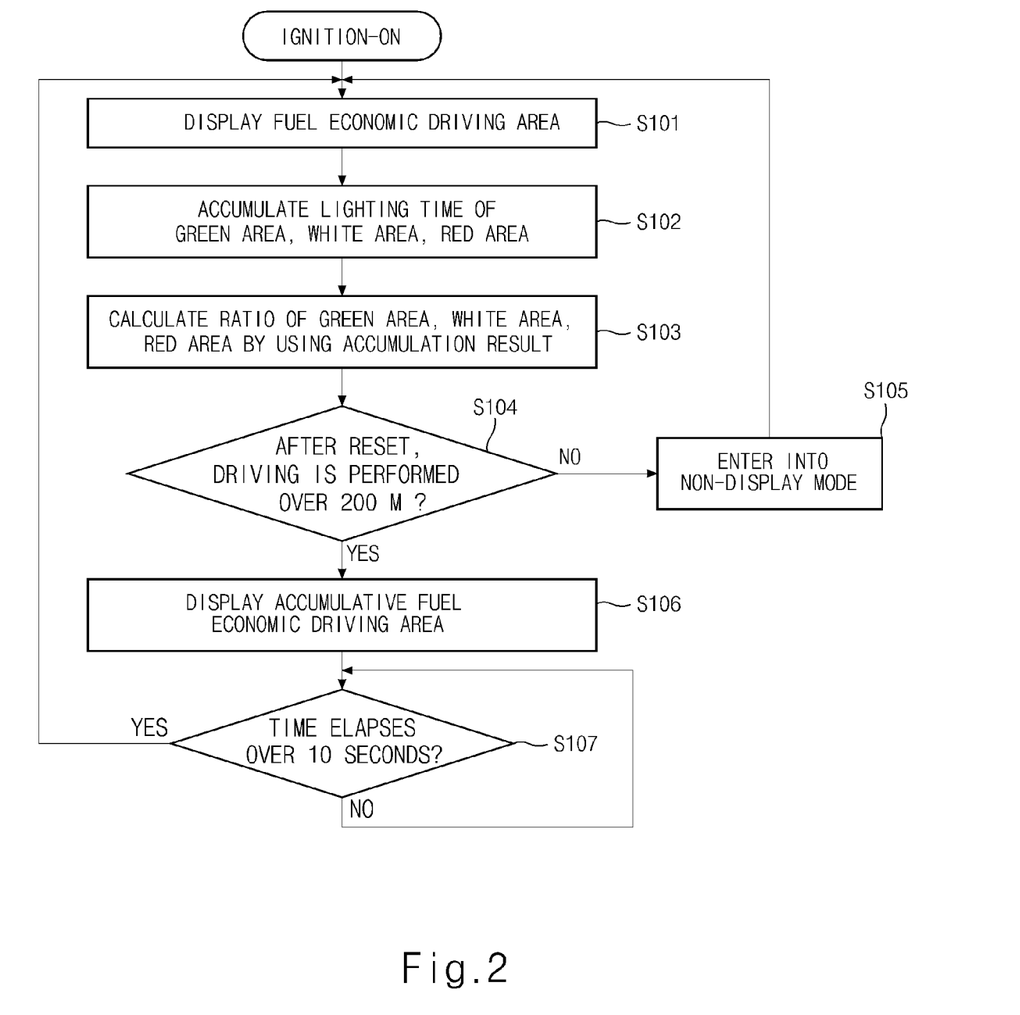
FIG. 2 is a flowchart showing a method of displaying an accumulative fuel economic driving area according to an embodiment of the present invention.

Hereinafter, a method of displaying an accumulative fuel economic driving area according to an embodiment of the present invention will be described with reference to FIG. 2.

When a vehicle is in ignition-on state (IG-on), the controller 220 of the accumulative fuel economic driving area display system 200 calculates the fuel economic driving area by using the shift pattern map. The fuel economic driving area is displayed with the driving state of a driver as shown in FIG. 5a or FIG. 5b (S101). Higher economic driving zone can be shown in green, intermediate economic driving zone can be shown in white, and lower economic driving zone can be shown in red, for example and illustration purpose.

Thereafter, the controller 220 accumulates the respective lighting times of the green zone, the white zone, and the red zone (S102). The accumulated lighting times can be obtained in the method as shown in Table 2.

TABLE 2

A = green zone lighting time + A'
B = white zone lighting time less deactivated mode time + B'
C = red zone lighting time + C' where,
A' is an accumulated green zone lighting time up to a previous time point,
B' is an accumulated white zone lighting time up to a previous time point, and
C' is an accumulated red zone lighting time up to a previous time point.

In the Table 2, the deactivated mode time with regard to B includes the case where the vehicle speed is 0, the case where the gear is not in "D" position (e.g., the case where the gear is in R, N, P, or S position), the case where the cruise control function (the function of setting up a specific speed so that the vehicle be driven at a specific speed) is performed, the case where the auto transmission oil temperature exceeds 120° C. or is lower than 20° C., and the case where the coolant temperature is lower than 70° C.

From the-thus obtained accumulated times, the ratios of the green zone, the white zone, and the red zone are calculated (S103). The ratios can be obtained in the method as shown in Table 3.

TABLE 3

D = A/(A + B + C)
E = B/(A + B + C)
F = C/(A + B + C)

where,
D is the lighting ratio of the green zone,
E is the lighting ratio of the white zone, and
F is the lighting ratio of the red zone.

In this way, including D, E, and F, they are called as an accumulative fuel economic driving area ratio.

Thereafter, after the accumulative fuel economic driving area ratio is reset, the controller 220 determines whether the vehicle is driven over a predetermined distance, e.g., 200 m (S104). At this time, the accumulative fuel economic driving area ratio can be reset, for example, by a reset button 250 or by attaching and detaching a battery.

When it is determined that the vehicle is not driven over the predetermined distance, 200 m after the reset operation, the display unit 230 enters into a non-display mode so that the accumulative fuel economic driving area ratio is not displayed (S105). On the other hand, if it is determined that the vehicle is driven over the predetermined distance after the reset operation, the display unit 230 displays the accumulative fuel economic driving area (S106).

The controller 220 determines whether a predetermined time, e.g., 10 seconds, elapses after displaying the accumulative fuel economic driving area (S107). If it is determined that the predetermined time elapsed, the step S104 to step S106 are repeatedly performed.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A system for displaying an accumulative fuel economic driving area of a vehicle, the system comprising:
   a vehicle information unit configured to collect vehicle information;
   a display unit configured to display a fuel economic driving area which includes a plurality of zones which each indicate a particular state of fuel economic driving for a given operation mode and an accumulative fuel economic driving area; and a controller configured to calculate the zones by using vehicle speed information and information collected by a throttle position sensor, to calculate the accumulative fuel economic driving area by accumulating one or more lighting times on which a zone of the plurality of zones corresponds to a current driving state of the vehicle and the given operation mode of the vehicle are indicated on the display, for respective zones of the fuel economic driving area and to calculate respective accumulation ratios of the respective zones.

2. The system of claim 1, further comprising a reset button for resetting the accumulation ratios.

3. The system of claim 1, wherein the zones include a maximum fuel economic driving zone, an intermediate fuel economic driving zone, and a minimum fuel economic driving zone and wherein the controller accumulates a lighting time of the maximum fuel economic driving zone, a lighting time of the intermediate fuel economic driving zone, and a lighting time of the minimum fuel economic driving zone, respectively, the lighting time of the intermediate fuel economic driving zone excluding a deactivated mode time.

4. The system of claim 1, wherein the controller calculates the respective accumulation ratios by accumulating the respective lighting times when the vehicle is driven over a predetermined distance after the accumulation ratios are reset.

5. The system of claim 1, wherein when a predetermined time elapses after the accumulative fuel economic driving area is displayed, the controller repeats the accumulation of the respective lighting times and calculation of the respective accumulation ratios.

6. The system of claim 1, wherein the controller determines the plurality of zones of the fuel economic driving area according to a reference throttle position sensor value in a starting mode, determines the fuel economic driving area as a maximum fuel economic driving zone in a deceleration mode, and determines the plurality of zones of the fuel economic driving area by additionally using a shift pattern map.

7. The system of claim 6, wherein, when a damper clutch is turned on, the controller determines an area which is under a damper clutch on curve as a maximum fuel economic driving zone, while when the damper clutch is turned off, determining an area which is under damper clutch off curve as a maximum fuel economic driving zone.

8. The system of claim 7, wherein the controller determines as an intermediate fuel economic driving zone an area which is under a shift pattern curve in which the TPS generates a down-shift in the driving mode, while determining as a minimum fuel economic driving zone an area which exceeds the shift pattern curve.

9. A method for displaying an accumulative fuel economic driving area of a vehicle, the method comprising:

calculating, by a controller, a fuel economic driving area which includes a plurality of zones which each indicate a particular state of fuel economic driving for a given operation mode by using vehicle information and a shift pattern map, accumulating, by the controller, at least one lighting time on which a zone of the plurality of zones corresponds to a current driving state and the given operation mode of the vehicle is indicated on the display, for each of the zones within the fuel economic driving area;

calculating, by the controller, respective accumulation ratios of the respective accumulated lighting times of the respective zones; and displaying, by a display unit, the respective accumulation ratios.

10. The method of claim 9, wherein accumulating at least one lighting time further comprises accumulating a lighting time of a maximum fuel economic driving area, a lighting time of an intermediate fuel economic driving area, and a lighting time of a minimum fuel economic driving area, the lighting time of an intermediate economic driving area excluding a deactivated mode time.

11. The method of claim 9, wherein the respective ratios are displayed in the form of a bar.

12. The method of claim 9, wherein displaying the respective accumulation ratios further comprises:

determining whether the vehicle is driven over a predetermined distance after the respective ratios are reset; and displaying the respective accumulation ratios when it is determined that the vehicle is driven over the predetermined distance while not displaying the respective accumulation ratios when it is determined that the vehicle is not driven over the predetermined distance.

* * * * *